United States Patent [19]

Soleri

[11] Patent Number: 5,239,807
[45] Date of Patent: Aug. 31, 1993

[54] FLEX-PACK CASE PACKER

[75] Inventor: Richard Soleri, Westlake Village, Calif.

[73] Assignee: Soleri Design/Automation, Inc.

[21] Appl. No.: 959,270

[22] Filed: Oct. 9, 1992

[51] Int. Cl.$^5$ .......................... B65B 9/08; B65B 39/12
[52] U.S. Cl. ........................................ 53/451; 53/244; 53/536; 53/551
[58] Field of Search ................ 53/451, 552, 551, 555, 53/554, 244, 245, 255, 536, 538, 535, 475, 473

[56] References Cited

U.S. PATENT DOCUMENTS

| 4,353,196 | 10/1982 | Beer et al. | 53/451 |
| 4,514,959 | 5/1985 | Shroyer | 53/451 X |
| 4,800,703 | 1/1989 | Goodman | 53/244 X |
| 4,827,692 | 5/1989 | Fiske et al. | 53/244 |

Primary Examiner—James F. Coan
Attorney, Agent, or Firm—Poms, Smith, Lande & Rose

[57] ABSTRACT

A pneumatically operated flex-pack case packer for servicing a form-fill-seal machine. The flex-pack case packer employs a two-stage displacement cylinder to move an interchangeable head assembly having grippers that, when moved into position to receive severed flexible pouches from the form-fill-seal machine, grasp the flexible pouches. The head assembly is then retracted and swung from its horizontal position to a vertical position. Once an open top container is indexed into position, the head assembly is lowered toward the container and the grippers open to release the flexible pouches. Also, the lateral distances between the flexible pouches as they are held by their respective grippers can be expanded or contracted by using an air cylinder to actuate a rocker arm. A programmable controller coordinates all air control valve and solenoid activity. The flex-pack case packer is mounted on a frame that is attached to a hinge, thus allowing the flex-pack case packer to swing away from the form-fill-seal machine during maintenance procedures or malfunctions.

37 Claims, 6 Drawing Sheets

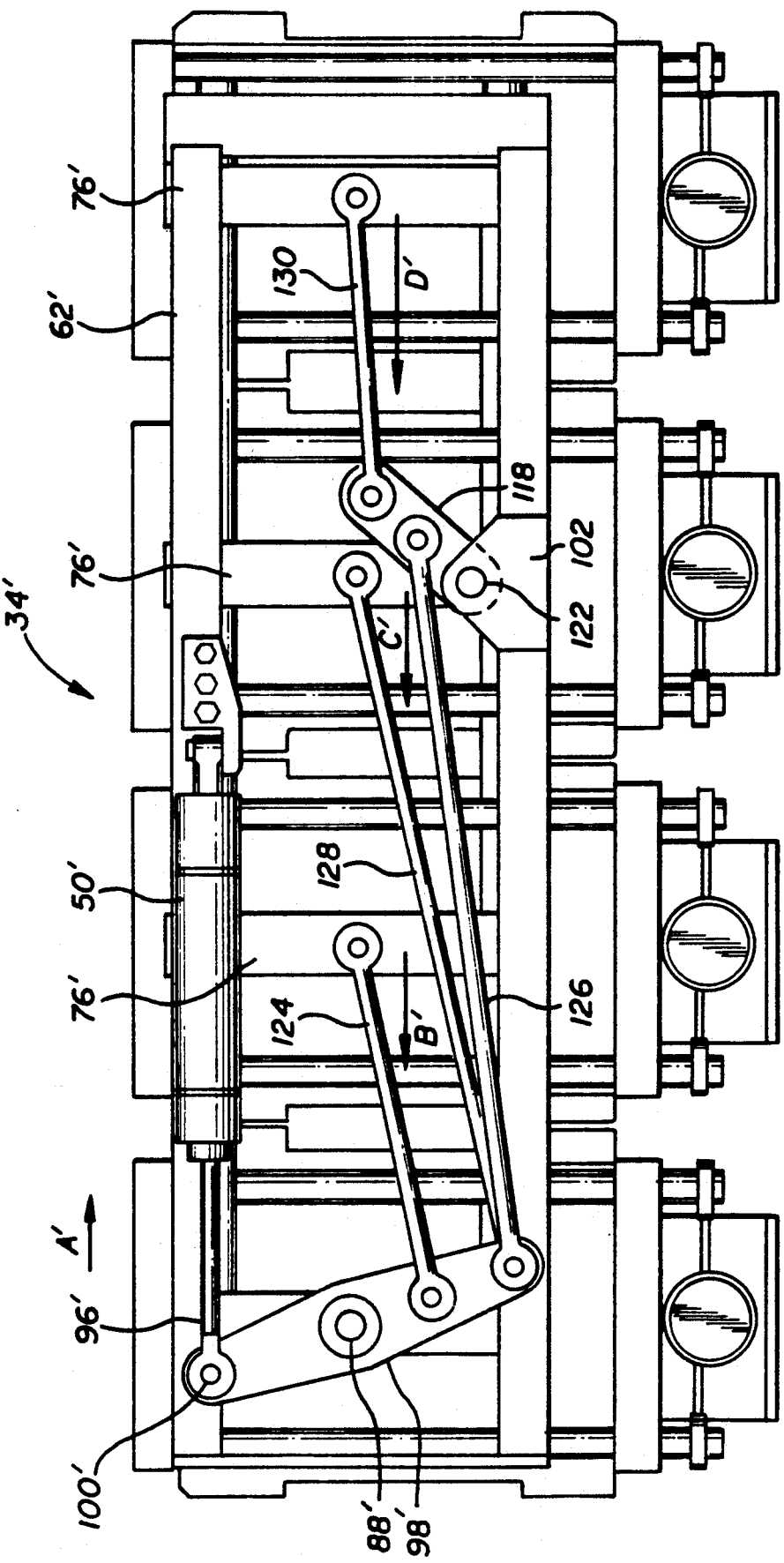

FLEX-PACK CASE PACKER

BACKGROUND OF THE INVENTION

1. Field of the Invention

The present invention relates to automated material handling and packaging equipment. More precisely, the present invention relates to a method and apparatus for automatically grasping flexible packages and placing them in storage containers for subsequent shipment.

2. Description of the Prior Art and Related Information

Food and beverage industries have employed automated packaging equipment for many years. Typically, the goods to be packaged are held in rigid containers so that the packaging machinery can easily grasp and manipulate each article. An example is in bottling plants where bottles are washed, cleaned, and filled with soda, capped and dispensed into shipping crates, all without much human intervention. Quite often, these machines use pneumatically or hydraulically driven grippers or manipulators that can process large quantities of bottles quickly, and with a minimum of down time. The machines used to package bottles, cans, or similar rigid structures tend to be very large and are usually completely dedicated to the specific task. Primary tasks of these machines include sorting the cans or bottles and arranging them in the proper orientation before they are collected and placed inside shipping cartons. Because the articles to be packaged are protected in a rugged plastic, glass, or metal shell, the handling equipment can be of simpler design and can be more vigorous in operation. No special handling hardware is necessary since the rigid shells are easily gripped by the automated machinery.

On the other hand, especially in the food industry, flexible packages are used to carry liquids, or frangible foodstuff such as potato chips. These flexible packages are more difficult to process and to package because of their soft, pliable exterior and their delicate contents. Indeed, the flexible package is difficult for an automated machine to grasp and handle. Obvious problems include mishandling (e.g., dropping) the soft packages when not enough gripping pressure is used, and rupturing, puncturing or crushing the contents when too much gripping pressure is used. In addition, the flexible nature of the packages results in unpredictable, and amorphous shapes that vary from one package to the next. By contrast, hard shelled articles, like a bottle, have precise dimensions and a uniform exterior that do not change from one bottle to the next in a production line. Hence, the packaging machinery can be of simpler design.

As mentioned above, a common example of where a flexible pouch might be used is in the food industry. There, a machine known as a form-fill-seal machine is used to fill flexible pouches containing frangible consumables such as potato chips, cereals, or fluid matter such as catsup, mustard or the like. Generally, the form-fill-seal machine is a mechanism that dispenses a series of plastic pouches which are indexed into position and filled with the liquid or solid contents. These plastic pouches, called flexible pouches, are then individually heat-sealed by welding the sides of the pouch together and then cut from the other packs. At this stage, the form-fill-seal machine must be unloaded manually using human labor. An attendant must sort through the filled flexible pouches and manually lay the flexible pouches into shipping containers or cases. The process, because of its demand for human labor, is time consuming, inefficient, and expensive.

Although modern pick and place robots have manipulator arms that are capable of performing the same function as a person, the archetypal pick and place robot is a complex machine which does not have high throughput capability. Also, pick and place robots can be expensive, and require sophisticated programming.

Pick and place robots typically are not designed for mass production of flexible articles. Even though the conventional pick and place robot may have vision for shape recognition, and tactile feedback systems coordinated by perhaps some level of artificial intelligence, those features add significantly to the cost of the robot. Moreover, adding a vision system along with a tactile feedback system to the robot may slow down what is already a slow cyclic rate. Therefore, a need presently exists for a method and apparatus for servicing flexible pouches dispensed from, for example, a form-fill-seal machine.

SUMMARY OF THE INVENTION

Therefore, in view of the foregoing, it is an object of the present invention to provide a method and apparatus for handling flexible pouches containing a fluid substance or frangible matter. It is another object of the present invention to service a form-fill-seal machine. It is still another object of the present invention to handle flexible pouches and to dispense and arrange the pouches in a container. It is yet another object of the present invention to provide flex-pack case packer having a high processing rate. It is still yet another object of the present invention to provide a flex-pack case packer for servicing a form-fill-seal machine that has a high throughput and is completely automated, thus presenting a low cost alternative to manual labor for servicing a form-fill-seal machine. It is yet another object of the present invention to provide a flex-pack case packer having a compact or unobtrusive size that easily adapts to a food processing environment.

To achieve the foregoing objectives, the present invention relates to a method and apparatus for servicing a form-fill-seal machine. Although the present invention is described hereinafter as it relates to a form-fill-seal machine, it is understood that the invention is easily adaptable to other material processing machines and the present description discloses only exemplary embodiments.

In particular, the present invention provides a flex-pack case packer for servicing a form-fill-seal machine having a heat sealer and cutter. The form-fill-seal machine, as is known in the art, supplies a roll of plastic pouches that are indexed into position and are filled with consumables such as catsup or potato chips. After filling, each flexible pouch is heat-sealed closed and severed from the roll by a cutter. By force of gravity, the severed flexible pouch drops downward.

Positioned beneath the cutters along the fall path of the flexible pouch is a gripper of the present invention. As the name implies, the gripper functions as an articulating human hand to grip the fallen flexible pouch. A back plate adjacent the gripper guides the falling flexible pouch onto a support plate, which catches the flexible pouch. Triggered from an impulse from the form-fill-seal machine that corresponds with the cutting of the flexible pouch, the gripper is displaced toward the back plate in preparation to receive the falling flexible pouch. Once the flexible pouch falls onto the support plate, individual fingers of the gripper swing toward each other to close in on the flexible pouch centered therebetween.

All activity of the present invention is coordinated by a programmable controller. Thus, the electrical impulse from the form-fill-seal machine is fed directly into the programmable controller to initiate activity.

Next, a displacement cylinder to which the gripper is attached retracts the gripper including the flexible pouch away from the form-fill-seal machine. The gripper along with the displacement cylinder are mounted on a pivot, and the pivot is mounted to the frame of the flex-pack case packer. Thus, the pivot allows the aforementioned assembly to swing from a horizontal position where the flexible pouch is collected to a vertical position where the flexible pouch is deposited in a container. The frame is mounted to the side of the form-fill-seal machine. Accordingly, the gripper and displacement cylinder can swing along a vertical plane to strike out an approximate 90 degree arc from the horizontal position to the vertical position, and back.

As the process continues the gripper swings downward to the vertical position, about the pivot, and stops directly above a shipping crate or like container. The displacement cylinder is now oriented vertically with the gripper positioned beneath the pivot.

The displacement cylinder extends forward to move the gripper toward the open top container. The gripper opens and releases the flexible pouch, which drops into the container by pull of gravity. The gripper system can also place the flexible pouches directly into the container without reliance on gravity. A simple programmable controller adjustment causes the grippers to be positioned precisely for careful placement or stacking of the flexible pouches. Hence, it is possible to tune the displacement cylinder and the release of the flexible pouch so that the flexible pouch is gently placed into the container in applications when the seal of the flexible pouch might easily be broken. Immediately, the displacement cylinder retracts the gripper and pivots into the horizontal position again. The entire cycle is then repeated.

The present invention preferably provides a two stage displacement cylinder, wherein the first stage extension is a coarse displacement and the second stage extension is a fine displacement. This way, as the displacement cylinder is pivoted up to the horizontal position, the gripper is moved through the coarse displacement simultaneously so that it is poised to move forward along the fine displacement when the next flexible pouch is severed from the roll. Moving the gripper over the coarse displacement before the cutting action occurs saves precious processing time. The fine displacement moves the gripper over a shorter distance at a slower speed to precisely locate the gripper to receive the falling flexible pouch. In sum, the two stage displacement cylinder permits precise placement of the gripper and efficiently uses process time to minimize travel time of the gripper.

The displacement cylinder and gripper are preferably operated through air pressure, provided through house air lines. Similarly, the displacement cylinder is rotated about the pivot by way of an air operated rotary actuator. The programmable controller performs all sequencing functions and coordinates the action for the pneumatic system as well as for the electrical and the electromechanical systems.

A conveyor or similar type transport mechanism feeds and indexes the containers to sequentially locate each container in a position to receive the flexible pouch as it is released by the gripper. Indexing of the containers is coordinated by the programmable controller. As mentioned above, the entire sequence of operations for the present invention may be triggered, at the time when the flexible pouch is severed from the roll, by an electrical impulse from the form-fill-seal machine. The impulse triggers the programmable controller to start the sequence of operations. Of course, other events can be used to trigger the flex-pack case packer.

The present invention is supported by a frame that is hinged to the form-fill-seal machine. This feature allows the entire flex-pack case packer to swing away from the form-fill-seal machine, thereby exposing a chute. The chute permits easy access to the form-fill-seal machine, the cutter, and the flexible pouches as they are severed from the roll. So if a malfunction should occur in the present invention flex-pack case packer, the severed flexible pouches drop down the chute, and the flexible pouches can be loaded into the containers manually. Due to its compact size, swinging the flex-pack case packer in either direction is a quick and simple task. Consequently, maintenance duties and repair jobs on the form-fill-seal machine and the flex-pack case packer can be performed efficiently and conveniently.

To improve throughput of the form-fill-seal machine, it is often beneficial to fill several flexible pouches simultaneously. Thus, four or more flexible pouches aligned in a row and can be simultaneously indexed into position for filling in the form-fill-seal machine. The four flexible pouches are filled and concurrently heat sealed and cut from the roll.

To accommodate four flexible pouches aligned in a row, the present invention provides four grippers disposed four across on a head assembly at the end of the displacement cylinder. As before, the head assembly is extended toward the back plate and the four severed flexible pouches drop into the respective gripper awaiting below.

The head assembly, in general terms, comprises a plurality of crisscross linkages connected to each of the grippers. The pneumatically actuated head assembly, when set into motion, expands or contracts the relative distances between adjacent grippers by lever action in the crisscrossed linkages. In this manner, the lateral distance between adjacent flexible pouches as they are held by the grippers can be increased or decreased. Preferably, the four grippers are spread out to their widest expanse by the head assembly when they are poised to receive the flexible pouches immediately after they are severed from the roll. Thereafter, the head assembly shifts the grippers inward, closing in the adjacent distances therebetween. Thus, the flexible pouches are tightly bunched together before they are inserted into the container. This step ensures and maximizes efficient use of the interior volume of the container.

BRIEF DESCRIPTION OF THE DRAWINGS

The objects, features, and advantages of the present invention will be apparent to one skilled in the art from reading the following detailed description and viewing the drawings in which:

FIG. 9 is a rear view of a further embodiment of the head assembly shown in FIG. 6.

DETAILED DESCRIPTION OF THE INVENTION

The following specification describes a method and apparatus for collecting and packing flexible pouches dispensed from, for example, a form-fill-seal machine. In the description, specific materials and configurations are set forth in order to provide a more complete understanding of the invention. It is understood by those skilled in the art, however, that the present invention can be practiced without those specific details.

Figure 1:
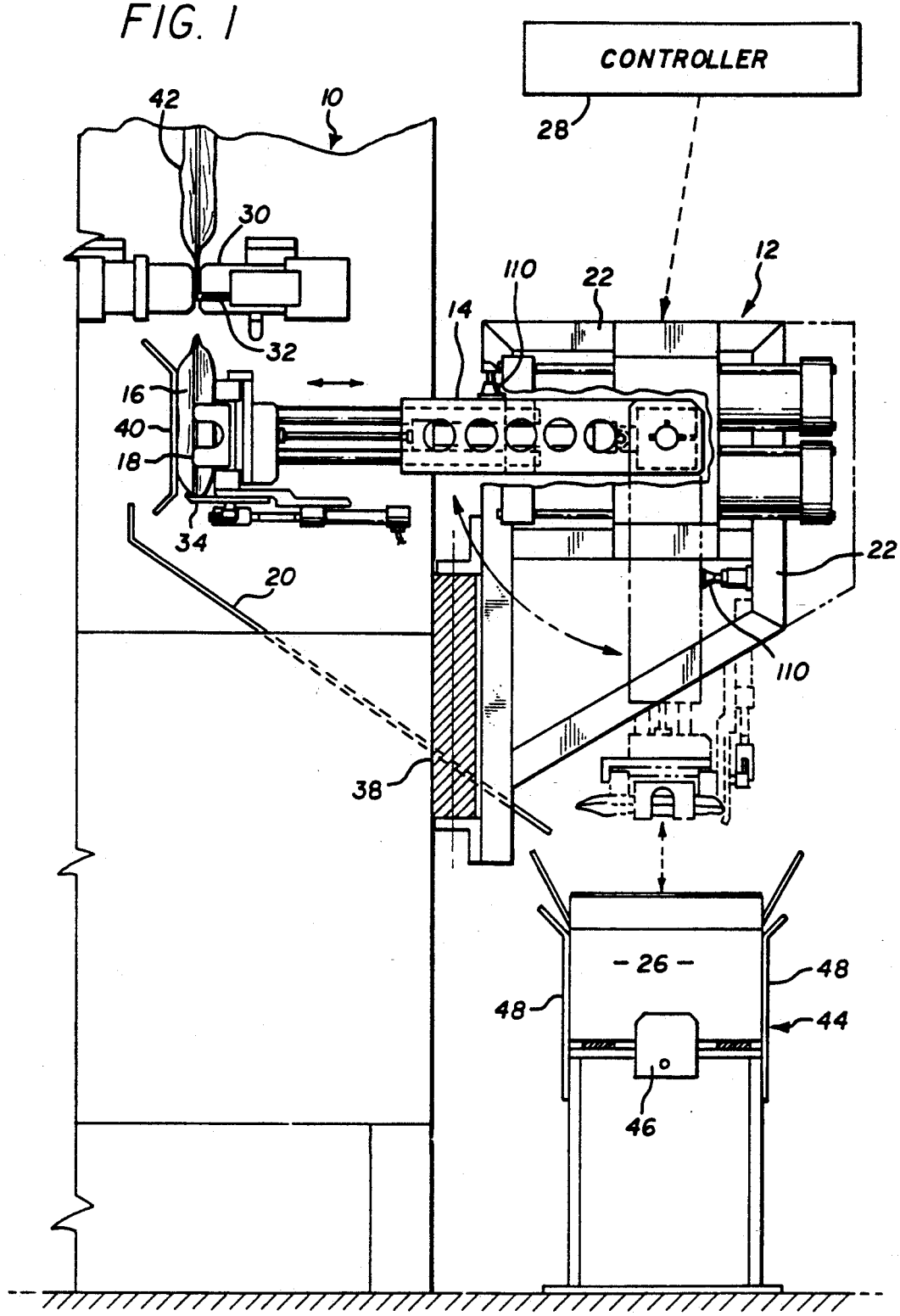
FIG. 1 provides a side view of a preferred embodiment of the present invention, attached to a form-fill-seal machine.

FIG. 1 provides a side elevational view a preferred embodiment of the present invention. As shown, the flex-pack case packer 12 is supported by a tubular frame 22. The frame 22 pivots on a frame hinge 38, which is connected to a form-fill-seal machine 10. The form-fill-seal machine 10 is known in the art and does not form a part of this disclosure. It is therefore only partially shown in the drawings. Generally, the form-fill-seal machine 10 is a device that fills small or large pockets formed in a roll 42 of flexible packaging material, such as plastic, then seals the pockets closed, and severs the pockets into separate pouches or as they are known in the art, flexible pouches 16. Often the flexible pouches 16 are filled with, for example, catsup, potato chips, or other related consumables or foodstuff. The pre-formed pockets that are dispensed from the roll 42 are arranged in parallel rows. Each row is indexed into a fill position where they are loaded with the consumable. Thereafter, a heat sealer 30 of the form-fill-seal machine 10 engages and welds the flexible pouches 16 closed. A cutter 32 then severs the sealed flexible pouches 16 from the roll 42.

By force of gravity, the flexible pouches 16 drop downward. Positioned directly in the fall path is a plurality of grippers is, arranged in a row, the number corresponding to the number of severed flexible pouches 16 per cycle. The grippers 18 are disposed across a head assembly 34. Directly behind the head assembly 34 is a displacement cylinder 14 for moving the head assembly 34 and associated grippers 18 forward and backward, as indicated by the arrows in FIG. 1.

FIG. 1 also shows the head assembly 34 disposed in a horizontal position. The head assembly 34 along with the displacement cylinder 14 may swing downward into a vertical position, shown by the phantom lines of FIG. 1. From its horizontal collection position to the vertical release position, the head assembly 34 strikes out a 90 degree angle centered at pivot 24. In the vertical position, the head assembly 34 can be reciprocated in an axial direction by the displacement cylinder 14 toward and away from an open top container 26 positioned therebelow. Naturally, the angles and positions involved can be altered as necessary to suit the placement of the container 26 and the form-fill-seal machine 10.

In the present invention, the entire sequence of motions is triggered by an electrical impulse from the form-fill-seal machine 10 to a programmable controller 28 The electrical impulse indicates a specific event, in this case, the moment the flexible pouch 16 is severed from the roll 42. Of course, other triggering events of the form-fill-seal machine 10 can be used to initiate operation of the flex-pack case packer 12.

The flex-pack case packer 12 through its grippers 18 collects the flexible pouches 16 severed from the roll 42 at its horizontal position. The flexible pouches 16, while gripped by the grippers 18, are swung into the vertical position and released into container 26. Each container 26 is moved along a conveyer system 44 and indexed into position by any means known in the art. For example, the conveyer system 44 can be a conveyor belt which starts and stops as needed; or the conveyor system 44 can be a series of rollers with a block 46 to interrupt container motion to coincide with the position of release of the flexible pouch 16 when the head assembly 34 is in the vertical position. Sidewalls 48 keep the container 26 on the conveyor system 44 as the container 26 is moved therealong.

Figure 2:
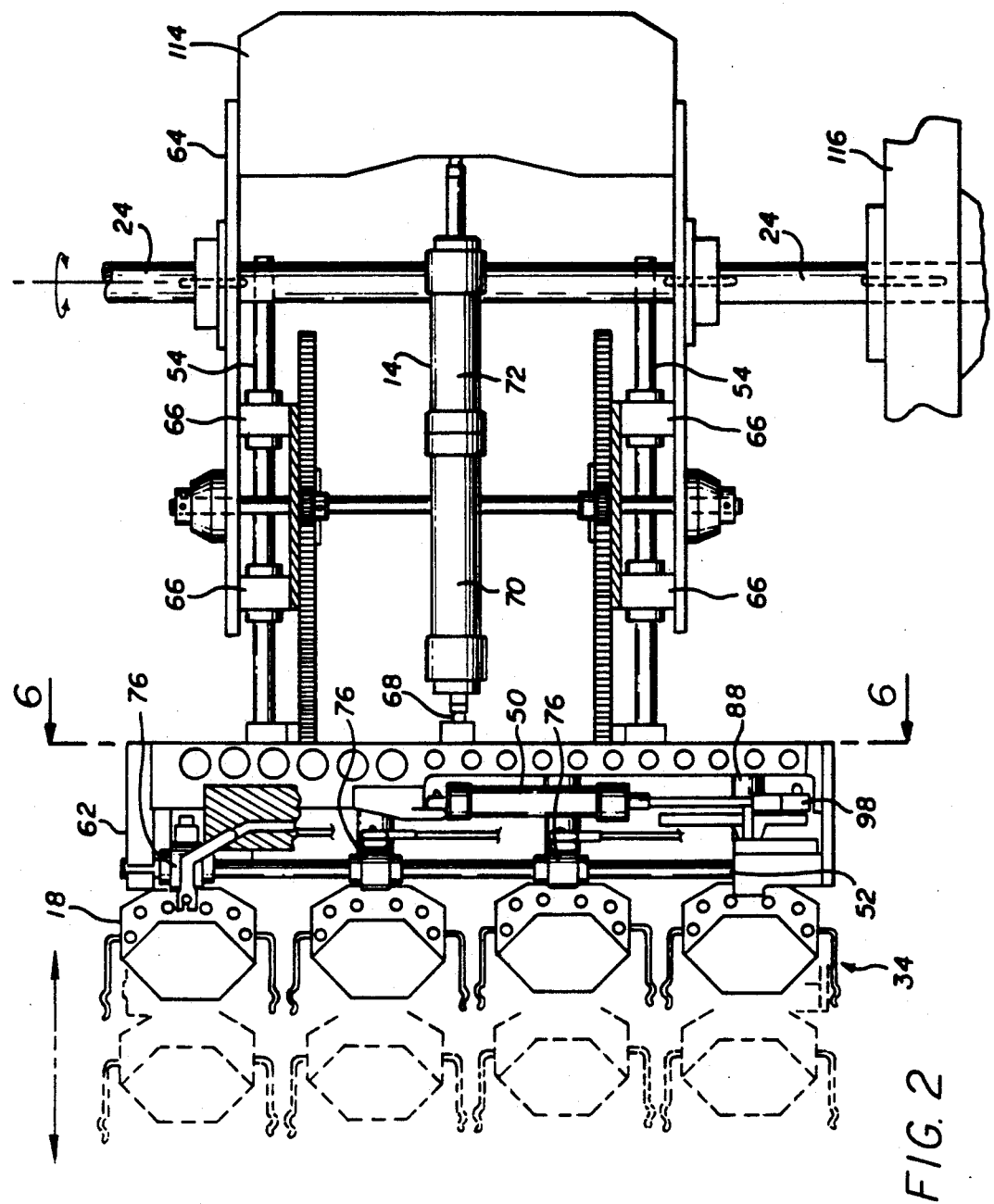
FIG. 2 provides a plan view of the displacement cylinder and the head assembly.

FIG. 2 provides a top view of a head assembly 34 and the displacement cylinder 14 of the present invention. The displacement cylinder 14 and head assembly 34 are mounted to a chassis 64 which rotates about a pivot 24, embodied in a shaft extending the width of the chassis 64. The displacement cylinder 14 is affixed to the back end of the chassis 64; at the front end, the cylinder 14 is attached to a carriage 62. On the carriage 62 of the head assembly 34 are individual grippers 18; in this embodiment, there are four grippers 18 arranged in a row. Each gripper 18 is free to slide laterally along a hardened support shaft 52 while riding on linear bearings. To actuate the lateral sliding motion of the grippers 18, an actuation cylinder 50 is provided on the carriage 62, and through hinged linkages, displaces the grippers 18. As a result, the distances between adjacent grippers 18 can be varied.

The displacement cylinder 14 displaces the entire carriage 62 and all grippers 18 forward and backward relative to the chassis 64 and pivot 24. During this to and fro axial motion of the carriage 62, hardened support shafts 54 slide through guides 66, which are disposed on the chassis 64. The guides 66 include linear bearings (not shown) that reduce friction. Therefore, the brunt of the mass from the grippers 18 and the carriage 62 is borne by the hardened support shafts 54 slidably coupled to the guides 66 through the linear bearings. In short, because the hardened support shafts 54 are lubricated and free to slide over the linear bearings of the guides 66, the forward and backward motion of the carriage 62 is not hindered.

The displacement cylinder 14 is preferably an air operated cylinder employing control valves (not shown) known in the art. The displacement cylinder 14 and valve operate from house air ranging from 90 psi to 120 psi. As is known in the art, a piston inside the displacement cylinder can be forced to reciprocate in various directions, depending on control valve operation. Accordingly, the carriage 62, which is attached to the cylinder 14, is moved by a connecting shaft 68 that is connected to the piston. The opposite end of the connecting shaft 68 is anchored to the chassis 64. Of course, more displacement cylinders can be added if the weight and inertia of the head assembly are too great for a single cylinder to handle.

The head assembly 34 unevenly weighs one end of the displacement cylinder 14, which is supported at the pivot 24 acting as a fulcrum. Hence, the head assembly 34 must be balanced by a counterweight 114. The counterweight 114 can be made of any material known in the art; it is preferably made of stainless steel.

Importantly, the displacement cylinder 14 comprises two displacement stages. A first stage 70 displaces the connecting shaft 68 for a long stroke of approximately four inches, while a subsequent second stage 72 displaces the connecting shaft 68 another two inches for a short stroke. Of course, the distance of each stroke and even the number of strokes can be changed according to need. In operation, the displacement cylinder 14 quickly moves the connecting shaft 68 and the associated head assembly 34 through the first stage 70, which is the coarse placement stage. This stage quickly locates the gripper 18 to their proper positioning near the fall path of the flexible pouches 16 as shown in FIG. 1. Just before the flexible pouches 16 are severed from the roll 42, the displacement cylinder 14 slowly moves the connecting shaft 68 through the second stage 72 to precisely locate the grippers 18 directly beneath the flexible pouches 16. An advantage to having two stages of travel for the displacement cylinder 14 is to locate the gripper 18 to a position near the fall path of the flexible pouches 16 as the head assembly 34 simultaneously swings from the vertical to the horizontal position. This concurrent motion saves precious process time, which would otherwise be wasted if the carriage 62 must move the entire distance from a fully retracted position to a fully extended position. Once the horizontal position is reached, the displacement cylinder 14 extends the head assembly 34 through a fine displacement stroke over a short distance to precisely locate the grippers 18 within the fall path of the flexible pouches 16. In FIG. 2, the phantom lines show the extended position of the grippers 18.

In sum, FIG. 2 illustrates the various movements performed by the present invention. First, the head assembly 34 can be extended or retracted axially by the displacement cylinder 14 relative to the pivot 24. Second, the lateral distance between adjacent grippers 18 can be adjusted by actuation cylinder 50. Third, the head assembly 34 along with the chassis 64 may be rotated about pivot 24.

The rotational motion of the chassis 64 and displacement cylinder 14 about pivot 24 is accomplished by a pneumatically operated rotary actuator 116. As with other pneumatic devices, the rotary actuator 116 is powered by house air lines and has solenoid controls activated by the programmable controller 28. Preferably, a PARKER rotary actuator is used, although other rotary actuators known in the art are acceptable. Torque from the rotary actuator 116 should preferably be approximately 390 inch-pounds.

Optionally, a toothed motor (not shown) may be used in place of the pneumatic rotary actuator. The toothed motor may be coupled to the chassis 64 via spur gears, bevel gears, worm gears, or like gear boxes, to transfer the torque from the motor to rotate the chassis 64. Naturally, other means known in the art can be used to generate the rotating action of the chassis 64 and displacement cylinder 14 about pivot 24.

The present invention head assembly 34 easily disassembles from the chassis 64 by separating from the connecting shaft 68 and sliding the hardened support shafts 54 out of engagement with the guides 66. To detach the head assembly 34, only six bolts (not shown) need to be removed; they are generally located where the connecting shaft 68 and the hardened support shafts 54 attach to the back of the carriage 62. Accordingly, it is possible to have interchangeable head assemblies equipped with different hardware or gripper configurations. For example, FIG. 2 shows a head assembly 34 having four grippers 18. Without much effort, a head assembly having three grippers can be substituted by the process delineated above.

Figure 3:
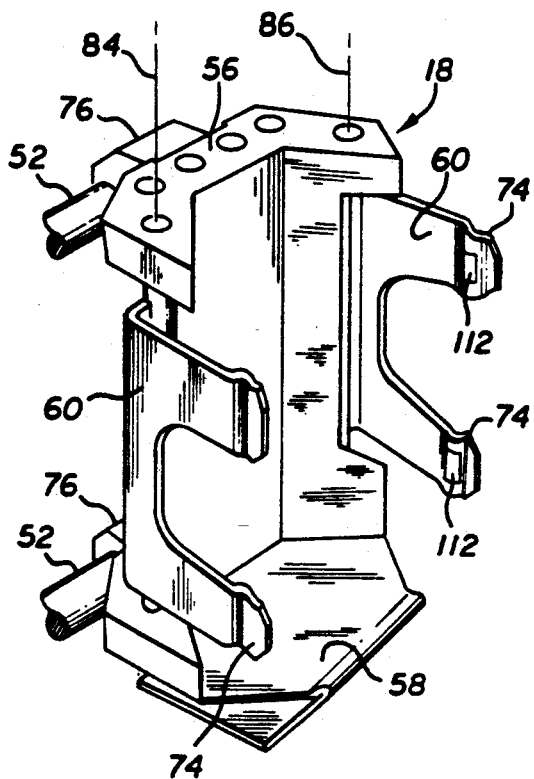
FIG. 3 is a perspective view of a preferred gripper in accordance with the present invention.
Figure 4:
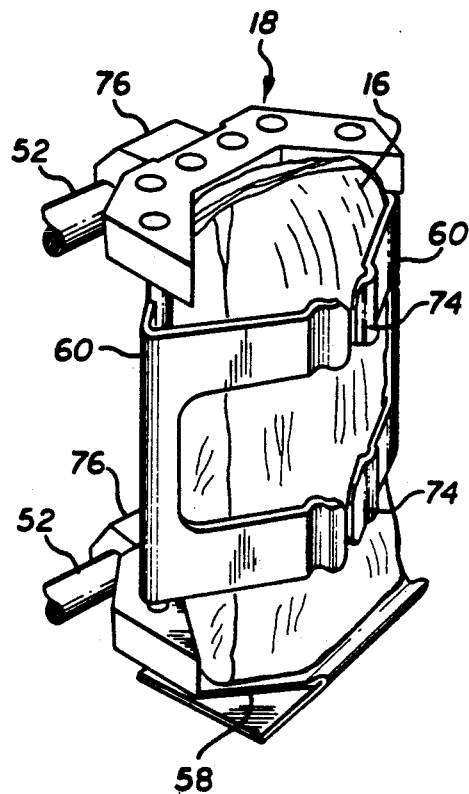
FIG. 4 shows the gripper of FIG. 3 wherein grippers have closed in to grasp a flexible pouch.
Figure 5:
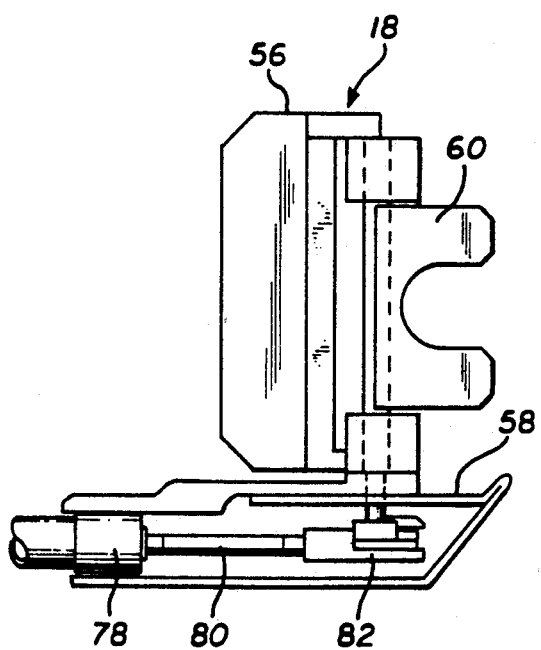
FIG. 5 is a side view of a preferred gripper showing the actuation mechanism.

FIGS. 3 and 4 provide perspective views of a preferred gripper 18, showing gripper palms 60 in an open position and a closed position, respectively. FIG. 5 provides a side elevational view of a gripper 18. Each gripper 18 is preferably comprised of a gripper body 56 having an extension at the bottom, denoted as support plate 58. The support plate 58 provides a platform for catching falling flexible pouches 16 when they drop from the form-fill-seal machine 10, as shown in FIG. 1. A back plate 40, shown in FIG. 1, supports the back of the flexible pouch 16. On either side of the gripper body 56 are the gripper palms 60 that are hinged thereto to provide a degree of articulation to the gripper 18. The gripper palms 60 are free to swing inward and outward along their respective rotational axes 84 and 86. Accordingly, when a flexible pouch 16 initially drops onto the support plate 58, it is supported by the support plate 58 at the bottom and propped up by the articulating gripper palms 60 on either side and by the gripper body 56 at the front. With the back plate 40 supporting the back of the flexible pouch 16, the flexible pouch 16 is effectively surrounded.

As shown in FIG. 4, the articulating gripper palms 60 swing inward to wrap around and grasp the flexible pouch 16. Indeed, fingers 74 of each gripper palm 60 help grasp the flexible pouch 16.

Behind the gripper body 56 are lugs 76 with linear bearings inserted therein that ride along the hardened shafts 52. Therefore, the lugs 76 suspend the grippers 18 on the hardened shafts 52, as best seen in FIG. 2. The linear bearings reduce friction so that the lugs 76 are free to slide along the hardened shafts 52.

As illustrated in FIG. 5, nestled beneath the support plate 58 are the linkages 82 that swing the gripper palms 60 simultaneously inward or outward. Each linkage 82 is connected to one gripper palm 60, while the opposite ends of the linkages 82 are commonly hinged together and connected to a piston rod 80 to form a "Y". Extending or retracting the piston rod 80, which forms the vertical stem of the "Y", moves the hinged joint between the linkages 82 forward or backward, thereby rotating the pair of gripper palms 60 along their respective axes 84 and 86. The result is an articulating action of the gripper palms 60 in order to grasp the flexible pouch 16. To actuate the piston rod 80, an air cylinder 78 is provided. The air cylinder 78 is triggered by an air control valve (not shown) known in the art, or by any other control means known in the art.

Optional pressure transducers 112 may be mounted on the fingers 74 and electrically connected to the programmable controller 28. This provides a means for determining or testing flexible pouch integrity in view of possible ruptures to the pouch, or damage to its frangible contents. For example, the transducers 112 may detect the pressure against the flexible pouch 16 when held by a gripper 18, thereby completing a data feedback loop to the programmable controller 28 to either adjust gripping pressure if needed. Alternatively, the gripper 18 may apply a predetermined amount of pressure, as measured by the pressure transducer 112, to ensure that all pouches 16 when squeezed at this pressure do not rupture. A ruptured pouch 16 is immediately removed from the production line. The procedures and hardware for performing the aforementioned tasks are well known in the art and need not be discussed further here.

Figure 6:
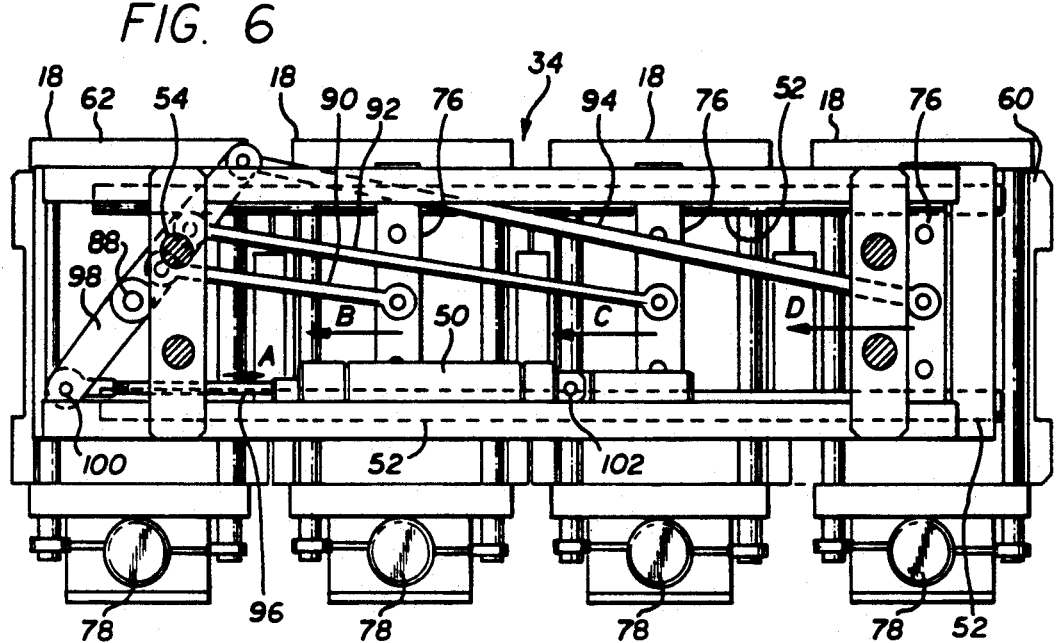
FIG. 6 is a rear view of the head assembly as seen from 6—6 of FIG. 2, showing the linkages used to expand or contract the distances between the grippers.

FIG. 6 is a rear view of the head assembly 34 shown in FIG. 2 as seen from line 6—6. FIG. 6 further illustrates the mechanisms used to expand or contract the distances between adjacent grippers 18. As shown here and described earlier, the four grippers 18 have lugs 76 holding linear bearings that slide on the hardened support shafts 52. Each gripper 18 is free to slide laterally along the two hardened support shafts 52 extending the width of the carriage 62.

In FIG. 6, the hardened support shafts 54 that support the carriage 62 are shown in a cross-section, represented by circles with cross-hatching. A rocker arm 98 is provided and swivels about pivot point 88, which is connected to the carriage 62. The connection point is most clearly shown in FIG. 2. Back in FIG. 6, the rocker arm 98 interconnects the actuation cylinder 50, via piston rod 96, with the four grippers 18. Also, linkages 90, 92, and 94 connect three of the grippers 18 on one side of the pivot point 88 to the rocker arm 98. At the opposite end of the rocker arm 98 and on the other side of the pivot point 88 is a pin 100 that connects the rocker arm 98 to the piston rod 96. The left-most gripper is also connected to this pin 100.

In operation, when the relative distances between each gripper 18 must be contracted, the actuation cylinder 50 retracts the piston rod 96 in the direction of arrow A in toward the cylinder 50. Pivot point 88 is fixed to the carriage 62 and is immobile. Consequently, retracting the piston rod 96 causes the pin 100 to also move in the direction of arrow A. A hinge 102 is provided on the actuation cylinder 50 to allow it to tilt downward slightly to accommodate the arcuate motion of the rocker arm 98 to which it is connected. Because the left-most gripper 18 is attached to pin 100, it is moved in the direction of arrow A as well.

Meanwhile, as the rocker arm 98 rotates counterclockwise around pivot point 88, the top portion of the arm 98 rotates toward the left, thereby pulling along linkages 90, 92 and 94. Because these linkages, 92 and 94 are hingeably connected to the respective lugs of the three remaining gripper 18, each gripper 18 is moved in the direction indicated by arrows B, C, and D. Because linkage 94 is attached to the outermost end of the rocker arm 98, the circumferential distance traversed by the point of attachment is the greatest; correspondingly, the right-most gripper 18 travels the greatest distance because linkage 94 is moved the longest distance. Hence, because the attachment points of the linkages 90 and 92 are located closer toward the pivot point 88 of the rocker arm 98, the distances that those linkages are moved by the rocker arm 98 decreases as well. The corresponding distances traversed laterally by the middle two grippers 18 decrease. To summarize, the left-most gripper 18 moves to the right according to arrow A, while the remaining three grippers move toward the left, as indicated by arrows B, C and D.

Lateral expansion to spread out the grippers 18 proceeds in the opposite sense. That is, the piston rod 96 moves out of the cylinder 50 to rotate the rocker arm 98 in a clockwise direction. The clockwise rotation of the rocker arm 98 pushes the respective gripper 18 farther apart. In an alternative embodiment, the foregoing expansion and contraction mechanism operates equally as well with fewer than four or more than four grippers. The back side of the cylinders 78 is also shown in FIG. 6.

FIG. 9 illustrates a further embodiment of the head assembly 34' shown in FIG. 6. In this embodiment, the actuation cylinder 50' is disposed at the top of the carriage 62'. As in the embodiment shown in FIG. 6, the rocker arm 98' is hinged at pivot 88' and connected via piston rod 96' to operate linkages 124, 126, and 128. In this embodiment, however, linkage 126 swings a slave lever 118 which then moves linkage 130 to pull the right-most gripper. The swiveling slave lever 118 is hinged at pivot 122, located on slave lever plate 120. In operation, the piston rod 96' retracts in direction A' into actuation cylinder 50'. This causes the rocker arm 98' to rotate clockwise, thus pulling linkages 124, 126 and 128 and the associated grippers in respective directions B' and C'. Linkage 126 is pulled by the rocker arm 98' and in turn swings slave lever 118 in a counterclockwise direction, thus pulling linkage 130 and the associated gripper in the D' direction. Pivot 88' is stationary. Pin 100' is attached to the left-most gripper. Thus, as piston rod 96' retracts in the A' direction, the pin 100' and associated gripper move in the A' direction. As in the embodiment shown in FIG. 6, the right-most gripper travels the farthest in the D' direction while the grippers closer to the center of the carriage 62' travel shorter distances due to the lengths of the linkages 124, 126 and 128, and their attachment points on the rocker arm 98'.

The foregoing action causes all grippers to move toward each other. To expand the grippers, all devices function in reverse. The action initiates when piston rod 96' extends out of the actuation cylinder 50' to rotate the rocker arm 98' counterclockwise. In this embodiment, use of a slave lever 118 in combination with two shorter linkages 126 and 130 to move the right-most gripper in place of one long linkage makes the entire linkage system more compact.

Figure 7:
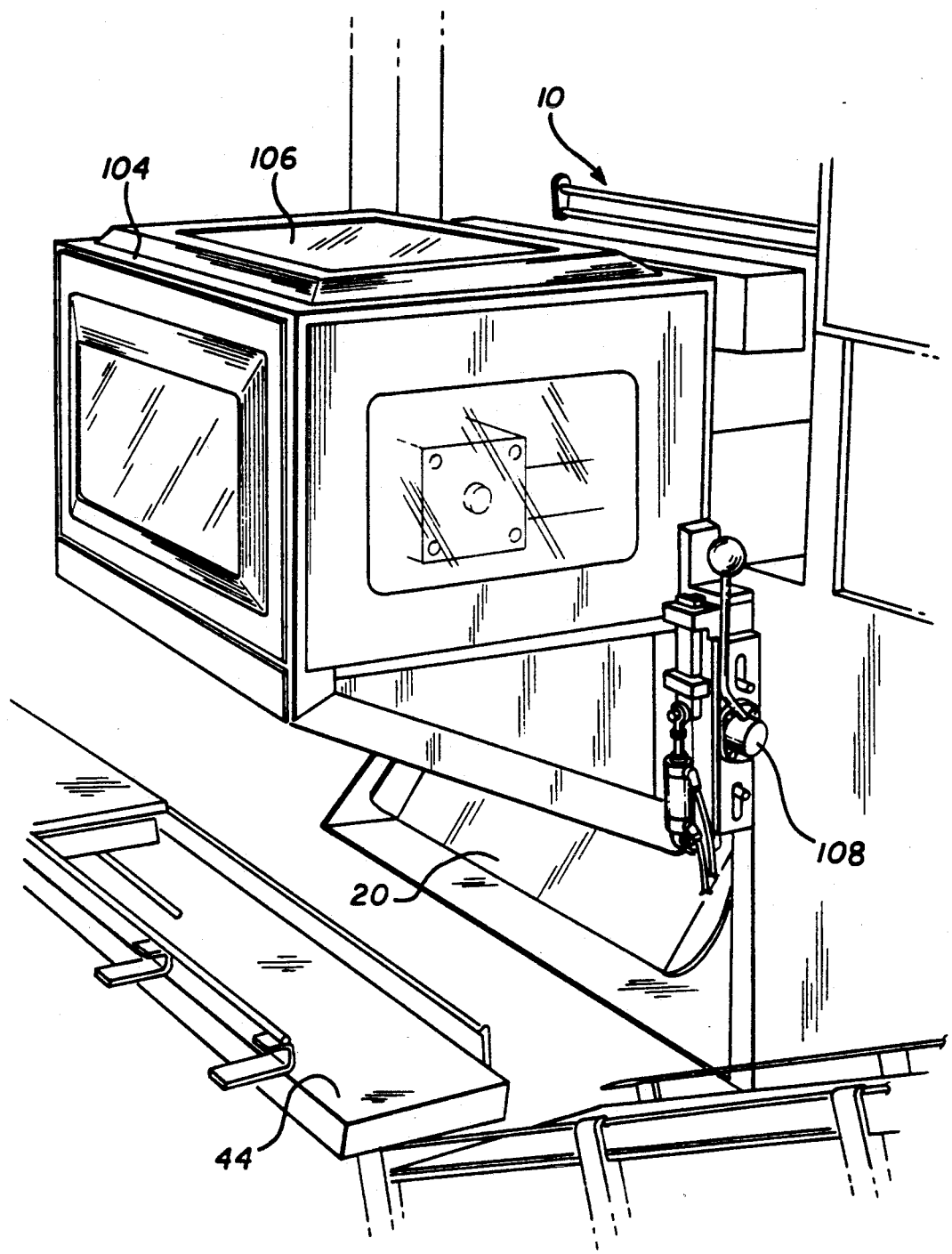
FIG. 7 shows an optional housing enclosing the present invention and a locking mechanism.

FIG. 7 provides a perspective view of an optional housing 104, which encloses the present invention flex-pack case packer 12 within. An optional safety lock 108 is also shown. The housing 104 includes windows 106 on four sides to permit inspection of the case packer therein. The bottom of the housing 104 is open so that the collected flexible pouches can be dispensed therethrough when the head assembly is moved into the vertical position. The safety lock 108 may include a kill switch so that when the lock 108 is disengaged, the operation of the flex-pack case packer is halted. Along that same vein, the housing 104 shields the mechanism inside from human appendages, thereby minimizing occupational hazards.

Figure 8:
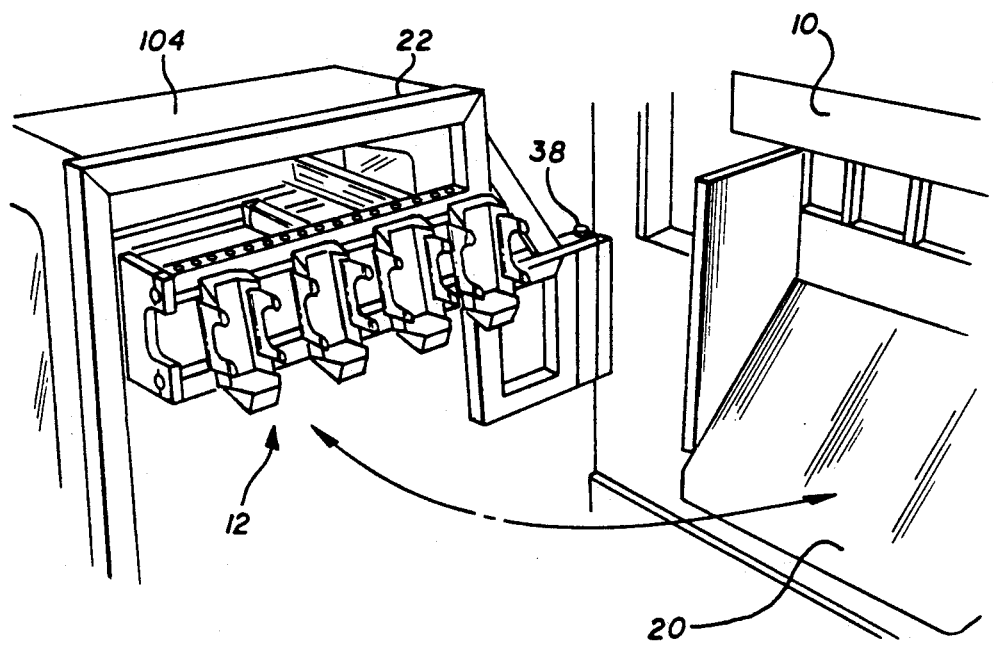
FIG. 8 is a perspective view of the present invention after it has been swung away from the form-fill-seal machine.

FIG. 8 provides a partial perspective view of the flex-pack case packer 12 after it has been swung away from the form-fill-seal machine 10. The housing 104 as well as the frame 22 supporting the flex-pack case packer 12 are mounted to the frame hinge 38, which is connected to the form-fill-seal machine 10. This swing-away feature of the present invention allows easy maintenance and repair of the flex-pack case packer 12 and the form-fill-seal machine 10. Furthermore, if the flex-pack case packer 12 malfunctions, it can be moved out of the process area quickly and easily. Meanwhile, the form-fill-seal machine 10 can be serviced manually by human labor. As shown in FIG. 8, without the flex-pack case packer 12 in place, the severed flexible pouches 16 simply drop down onto chute 20 and fall from the form-fill-seal machine 10.

As mentioned before, all solenoid and air valve operations are coordinated by a controller 28. In a preferred embodiment, the present invention employs an Allen Bradley Model SLC-100 or Cutler-Hammer Model D-100 programmable controller, or like controllers known in the art. Preferably, because the present invention is used with food products, all major components are fabricated from stainless steel or anodized aluminum. Furthermore, to save weight, many major parts are machined, drilled or formed with large holes.

The entire sequence of operation for the subject flex-pack case packer 12 proceeds as follows. When the form-fill-seal machine 10 severs the row of flexible pouches 16, they drop onto a fully extended head assembly 34. The flexible pouches 16 fall onto the respective support plates 58 of each gripper 18, the grippers 18 being spread apart laterally on the head assembly 34. Immediately, the gripper palms 60 wrap around the flexible pouches 16. Displacement cylinder 14 retracts the head assembly 34 away from the form-fill-seal machine 10. The head assembly 34 is then pivoted from its horizontal position to its vertical position by the pneumatically operated rotary actuator 116. As rotation begins from the horizontal position to the vertical position, the grippers 18 while holding the pouches 16 are moved in close together in preparation for placement in the open container 26 or case. Now, the displacement cylinder 14 extends the head assembly 34 downward toward the awaiting open top container 26. The gripper palms 60 swing away, thereby releasing the flexible pouches 16 into the container 6. Immediately, the head assembly 34 is retracted and once again pivoted to the horizontal position. In the interim, the displacement cylinder 14 can optionally extend the head assembly 34 through its first stage before the head assembly 34 reaches the horizontal position. Also, the lateral spacing of the grippers 18 is again expanded to its starting distance.

The present invention is capable of performing 18 to over 22 cycles of the foregoing process per minute. Each cycle handles four flexible pouches, so throughput is fairly fast. To improve the durability of the mechanism, optional bumpers 110 are provided on the frame 22 to cushion the inertial impact of the displacement cylinder 14 and associated head assembly 34 as both reciprocate between the horizontal position and vertical position.

Servo motors can be used in place of pneumatic displacement cylinders, and a motor/camco unit can be used in place of the rotary actuator to increase cycle speed. Using light-weight metals or composite materials in the linkages, carriage, grippers and other major parts reduce inertial mass and hence also improves speed and cycle time.

What is claimed is:

1. A flex-pack case packer for packaging flexible pouches into a container, comprising:
   a frame;
   a pivot, connected to the frame;
   a displacement cylinder connected to the pivot to rotate thereabout;
   a gripper, coupled to the displacement cylinder;
   a first actuator, connected to the gripper;
   a second actuator mounted to the frame and connected to the displacement cylinder;
   a power source for activating the first actuator and displacement cylinder; and
   a controller connected to the flex-pack case packer;
   whereby the controller controls the flex-pack case packer so that the displacement cylinder displaces the gripper to the flexible pouch where the first actuator closes the gripper to grab the flexible pouch, and wherein the displacement cylinder retracts and is rotated about the pivot by the second actuator, wherein the displacement cylinder extends the gripper and the first actuator opens the gripper to release the flexible pouch into the container.

2. The flex-pack case packer according to claim 1, wherein the flex-pack case packer further comprises a plurality of grippers disposed side-by-side across a head assembly connected to the displacement cylinder, said head assembly including a third actuator connected to the grippers, whereby said third actuator displaces the grippers laterally, and said third actuator is connected to the power source.

3. The flex-pack case packer according to claim 2, wherein the displacement cylinder further comprises a coarse displacement first stage and a fine displacement second stage.

4. The flex-pack case packer according to claim 3, wherein the first actuator and the third actuator each comprises a fluid displacement cylinder.

5. The flex-pack case packer according to claim 4, wherein the second actuator comprises a rotary actuator.

6. The flex-pack case packer according to claim 5, wherein the power source comprises a fluid pump.

7. A flex-pack case packer for servicing a form-fill-seal machine having a heat sealer and cutter, wherein at least one flexible pouch of a roll of flexible pouches is indexed into a fill position by the form-fill-seal machine, wherein the flexible pouch is filled with a substance thereby and sealed by the heat sealer, and wherein the flexible pouch is cut by the cutter, and the flex-pack case packer collects the flexible pouches and deposits the flexible pouches in a container, the flex-pack case packer comprising:
   a frame reversibly engaging the form-fill-seal machine at the fill position;
   a pivot, connected to the frame;
   a displacement cylinder, having at least two stages of travel, connected to the pivot to rotate thereabout;
   a gripper, coupled to the displacement cylinder;
   a first actuator, connected to the gripper;
   a second actuator mounted to the frame and connected to the displacement cylinder;
   a power source for activating the first actuator and displacement cylinder; and
   a controller connected to the flex-pack case packer;
   whereby the form-fill-seal machine triggers the controller to activate the flex-pack case packer so that the two-stage displacement cylinder displaces the gripper to the flexible pouch where the first actuator closes the gripper to collect the flexible pouch from the form-fill-seal machine, and wherein the two-stage displacement cylinder retracts and is rotated about the pivot by the second actuator, wherein the two-stage displacement cylinder extends the gripper and the first actuator opens the gripper to release the flexible pouch into the container.

8. The flex-pack case packer according to claim 7, wherein the frame further comprises a hinge disposed between the frame and the form-fill-seal machine, whereby the hinge allows the flex-pack case packer to swivel toward and away from the form-fill-seal machine.

9. The flex-pack case packer according to claim 8, wherein the two-stage displacement cylinder further comprises first and second displacement stages wherein the first displacement stage displaces the gripper a first distance and the second displacement stage displaces the gripper a second distance.

10. The flex-pack case packer according to claim 9, wherein the first actuator comprises a fluid pressure cylinder coupled to the gripper.

11. The flex-pack case packer according to claim 10, wherein the gripper further comprises a gripper body, a support plate disposed on the gripper body to provide a bottom, a pair of gripper palms hingeably disposed on the gripper body and commonly linked at a gripper hinge, the gripper hinge being coupled to the first actuator, wherein the gripper palms substantially face each other and include inwardly curled fingers to provide opposed side walls, and a back plate disposed on the flex-pack case packer to provide a back wall, whereby the flexible pouch after being cut by the cutter drops onto the bottom and is held thereon by the opposed side walls and back wall.

12. The flex-pack case packer according to claim 11, wherein the flex-pack case packer further comprises bumpers disposed on the frame to cushion the rotation of the two-stage displacement cylinder.

13. The flex-pack case packer according to claim 12, wherein the case packer further comprises a head assembly, connected to the two-stage displacement cylinder, supporting a plurality of grippers disposed side-by-side, wherein the head assembly includes a third actuator for expanding and contracting a distance between the grippers.

14. The flex-pack case packer according to claim 13, wherein the third actuator further comprises crisscrossed linkages connected to the plurality of grippers.

15. The flex-pack case packer according to claim 14, wherein the controller is triggered by an electrical pulse from the form-fill-seal machine.

16. The flex-pack case packer according to claim 15, wherein the flex-pack case packer comprises an anodized aluminum material.

17. The flex-pack case packer according to claim 16, wherein the first displacement stage is a coarse displacement over a predetermined long distance and the second displacement stage is a fine displacement over a predetermined short distance.

18. The flex-pack case packer of claim 17, wherein the grippers further comprise pressure transducers connected to the controller.

19. The flex-pack case packer of claim 18, wherein the flex-pack case packer further comprises a conveyor to place the container in registration with a release position beneath the displacement cylinder.

20. The flex-pack case packer of claim 19, wherein the displacement cylinder and the head assembly include a plurality of through-holes to reduce weight.

21. The flex-pack case packer of claim 20, wherein the controller further comprises a programmable controller.

22. The flex-pack case packer of claim 21, wherein the first displacement stage is a larger distance than the second displacement stage.

23. The flex-pack case packer of claim 22, wherein the flex-pack case packer is enclosed inside a housing.

24. The flex-pack case packer of claim 23, wherein the housing further comprises a lock having a disrupt switch electrically connected to the controller.

25. The flex-pack case packer of claim 24, wherein the head assembly comprises four grippers.

26. A flex-pack case packer for servicing a form-fill-seal machine having a heat sealer and cutter, wherein at least one flexible pouch in a roll of flexible pouches is indexed into a fill position by the form-fill-seal machine, wherein the flexible pouch is filled with a substance thereby and sealed closed by the heat sealer, and wherein the flexible pouch is cut by the cutter, and the flex-pack case packer collects the flexible pouch and deposits the flexible pouch in a container, the flex-pack case packer comprising:
  a frame connected to the form-fill-seal machine by at least one hinge to allow the frame to swing away from and toward the form-fill-seal machine;
  a pivot, disposed on the frame;
  a displacement cylinder having multiple stages of travel, rotatably disposed on the pivot;
  a head assembly, disposed on the displacement cylinder, including linkages coupled with a first actuator;
  at least one gripper, disposed on the linkages of the head assembly, wherein the first actuator displaces the linkages and the linkages displace the gripper in a lateral direction;
  a second actuator for moving the displacement cylinder in an axial direction, which direction is substantially perpendicular to the lateral direction;
  a third actuator, disposed on the frame, for rotating the displacement cylinder about the pivot; and
  a controller, for controlling the gripper, the first actuator, the second actuator, and the third actuator;
  whereby a signal from the form-fill-seal machine triggers the controller to initiate coordinating movements of the first, second, and third actuators such that the displacement cylinder moves the head assembly to the form-fill-seal machine, wherein the gripper collects the flexible pouch, and the third actuator rotates the gripper to an overlying position above the container, and the gripper releases the flexible pouch therein.

27. The flex-pack case packer according to claim 26, wherein the displacement cylinder further comprises a first displacement stage for sequentially displacing the head assembly a first distance to provide a coarse placement of the head assembly, and a second displacement stage for displacing the head assembly a second distance to provide a fine placement of the head assembly.

28. The flex-pack case packer according to claim 27, wherein the gripper further comprises gripper palms that are paired and hinged on respective pivot points on the gripper, and wherein each pair of gripper palms is connected to at least one air cylinder, whereby the air cylinder simultaneously opens and closes the pair of gripper palms.

29. The flex-pack case packer according to claim 28, wherein the frame further comprises shock absorbers for engaging the displacement cylinder.

30. The flex-pack case packer according to claim 29, wherein a plurality of grippers are disposed side-by-side across the head assembly.

31. The flex-pack case packer according to claim 30, wherein the third actuator is a rotary actuator.

32. A flex-pack case packer for servicing a form-fill-seal machine that dispenses flexible pouches into containers, the flex-pack case packer comprising:
a frame, disposed on the form-fill-seal machine;
a pivot disposed on the frame;
an axial displacement actuator, rotatably connected to the pivot;
a transverse displacement actuator, disposed on the axial displacement actuator;
a plurality of grippers for gripping the flexible pouches, disposed on the transverse displacement actuator, wherein the transverse displacement actuator moves the grippers in a transverse direction, and the axial displacement actuator moves the transverse displacement actuator in an axial direction and rotates the transverse displacement actuator about the pivot, and wherein the axial direction is substantially perpendicular to the transverse direction; and
a controller for controlling movement of the axial displacement actuator, the transverse displacement actuator, and the grippers.

33. A flex-pack case packer according to claim 32, wherein the axial displacement actuator comprises a two-stage displacement cylinder.

34. A flex-pack case packer according to claim 33, wherein the two-stage displacement cylinder is operated by air pressure.

35. A method for collecting a plurality of flexible pouches spaced apart laterally substantially in a row, dispensed from a form-fill-seal machine, and depositing the flexible pouches into a container using a flex-pack case packer, the method comprising the steps of:
dispensing a plurality of flexible pouches;
triggering the flex-pack case packer;
supporting the dispensed flexible pouches on a support plate of the flex-pack case packer;
grasping the laterally spaced apart flexible pouches individually by a plurality of laterally spaced grippers provided on the flex-pack case packer;
moving the flexible pouches closer together to decrease the lateral spacing therebetween;
rotating the flexible pouches and grippers toward the container until the flexible pouches are in registration with an opening of the container; and
releasing the flexible pouches into the container.

36. The method of claim 35, wherein the method further comprises, after the step of supporting the dispensed flexible pouches, the steps of axially extending the grippers toward the form-fill-seal machine to a position to collect the dispensed flexible pouches and axially retracting the grippers toward the displacement means during rotation of the grippers; and after the step of rotating the flexible pouches, the step of axially extending the grippers toward the container prior to releasing the flexible pouches into the container.

37. The method of claim 36, wherein the method further comprises the step of moving the grippers laterally apart during the step of axially extending toward the form-fill-seal machine; and the step of moving the grippers laterally together during the step of axially extending the grippers toward the container.

* * * * *